(12) United States Patent
Hillenburg (10) Patent No.: US 11,931,815 B2
(45) Date of Patent: Mar. 19, 2024

(54) GUIDE BAR FOR NARROW BELT SAW

(71) Applicant: WF Meyers Company Inc., Bedford, IN (US)

(72) Inventor: Andrew Hillenburg, Avoca, IN (US)

(73) Assignee: WF Meyers Company Inc., Bedford, IN (US)

( * ) Notice: Subject to any disclaimer, the term of this patent is extended or adjusted under 35 U.S.C. 154(b) by 15 days.

(21) Appl. No.: 17/932,078

(22) Filed: Sep. 14, 2022

(65) Prior Publication Data

US 2023/0083756 A1    Mar. 16, 2023

Related U.S. Application Data

(60) Provisional application No. 63/261,173, filed on Sep. 14, 2021.

(51) Int. Cl.
*B23D 55/08*    (2006.01)

(52) U.S. Cl.
CPC .................. *B23D 55/082* (2013.01)

(58) Field of Classification Search
CPC ...... B23D 55/082; B23D 59/00; B23D 59/04; Y10T 83/8881
See application file for complete search history.

(56) References Cited

U.S. PATENT DOCUMENTS

| | | | | |
|---|---|---|---|---|
| 1,043,433 A | * | 11/1912 | Jackson .................. | B28D 1/082 125/21 |
| 3,176,675 A | * | 4/1965 | Bomba .................. | B28D 1/127 451/542 |
| 3,479,097 A | * | 11/1969 | McLauchlan .......... | B23D 59/04 83/820 |
| 4,945,889 A | * | 8/1990 | Fish ....................... | B28D 1/124 125/21 |
| 5,056,224 A | * | 10/1991 | Seigneur ................. | B27B 17/12 144/34.1 |
| 5,087,261 A | * | 2/1992 | Ryd ...................... | A61B 17/144 606/177 |
| 5,094,039 A | * | 3/1992 | Yoshioka ............ | F16H 57/0456 451/900 |
| 5,181,503 A | * | 1/1993 | Fish ........................ | B28D 1/08 125/21 |

(Continued)

FOREIGN PATENT DOCUMENTS

JP          S48-94094 U      11/1973

OTHER PUBLICATIONS

English Translation of JPS48-94094U. Retrieved Sep. 4, 2020.

*Primary Examiner* — Sean M Michalski
(74) *Attorney, Agent, or Firm* — Woodard. Emhardt, Henry, Reeves & Wagner, LLP (57) ABSTRACT

A cutting belt comprises a guide bar system that includes a guide bar. The guide bar has a first end section, a second end section, and a central section between the first end section and the second end section. A first upper fluid channel is defined through the guide bar. The first upper fluid channel has an entrance opening in the first end section of the guide bar and extends to the central section of the guide bar where it is in fluid communication with a bottom channel. The second upper fluid channel has an entrance opening in the second end section of the guide bar and extends to the central section of the guide bar where it is in fluid communication with the bottom channel.

20 Claims, 11 Drawing Sheets

(56) References Cited

U.S. PATENT DOCUMENTS

| | | | | |
|---|---|---|---|---|
| 5,251,408 | A | * | 10/1993 | Boaz ..................... B24D 5/10 |
| | | | | 451/542 |
| 5,290,135 | A | * | 3/1994 | Ball ..................... B23Q 11/10 |
| | | | | 407/11 |
| 5,403,318 | A | * | 4/1995 | Boehringer ........... B27B 19/006 |
| | | | | 606/178 |
| 5,735,259 | A | * | 4/1998 | Hoerner ................ B27B 17/12 |
| | | | | 125/21 |
| 5,797,187 | A | * | 8/1998 | Leini ..................... B27B 17/12 |
| | | | | 144/34.1 |
| 5,918,586 | A | * | 7/1999 | Von Dungen ......... B27B 17/025 |
| | | | | 125/21 |
| 6,202,528 | B1 | * | 3/2001 | Morgan ................. B26D 1/54 |
| | | | | 83/820 |
| 9,796,114 | B2 | * | 10/2017 | Bennett ................. B28D 1/086 |
| 10,882,127 | B2 | * | 1/2021 | Luja Hansen ......... B23D 55/02 |
| 2009/0255390 | A1 | * | 10/2009 | Chaffin ................. B23D 59/04 |
| | | | | 83/788 |
| 2010/0071681 | A1 | * | 3/2010 | Bade ..................... B28D 1/086 |
| | | | | 125/21 |
| 2011/0041663 | A1 | * | 2/2011 | Chaffin ................. A22C 17/08 |
| | | | | 83/13 |
| 2014/0352515 | A1 | * | 12/2014 | Chiao ................... B23D 55/086 |
| | | | | 83/788 |
| 2019/0210128 | A1 | * | 7/2019 | Luja Hansen ......... B23D 55/02 |
| 2023/0070451 | A1 | * | 3/2023 | King ..................... B27B 17/12 |

\* cited by examiner

GUIDE BAR FOR NARROW BELT SAW

CROSS REFERENCE TO RELATED APPLICATIONS

The present patent document claims the benefit of the filing date of Provisional U.S. Patent Application No. 63/261,173, filed on Sep. 14, 2021, which is hereby incorporated by reference in its entirety.

FIELD OF THE INVENTION

The present disclosure pertains generally to the field of cutting equipment, in particular to guide bars for cutting equipment.

BACKGROUND

Applicant has extensive experience in the cutting equipment industry. Applicant's business has supplied tools to the stone cutting industry for over 125 years, and Applicant also holds several patents on saws for cutting stone. For example, Applicant's U.S. Pat. No. 5,181,503 to Fish discloses a stone slab saw having a continuous flexible belt drivingly mounted to a plurality of sheaves rotatably mounted to a frame that is vertically movable by a pair of racks and pinions driven by a motor so that the belt can be moved vertically downward through a stone block during a cutting operation. A guide bar mounted to the frame supports the belt. That bar provides a rigid backing for the saw belt as it is driven and while it cuts through a block of stone. During a cutting operation, a lubricant is emitted through passageways in the guide bar.

Another of Applicant's patents, U.S. Pat. No. 4,945,889 to Fish, illustrates a stone cutting belt having a flexible and continuous main body. The belt includes a plurality of cutter segments, each comprising a preferably metallic drive block and a metallic carrier block mounted on the top surface of the drive block. Continuous cables extend along the entire length of the belt and through openings in the plurality of drive blocks. The main body is of a resilient material in which the cutter segments and cables are embedded in an injection molding process.

While these devices are suitable for cutting, improvements are desired.

SUMMARY

The present disclosure pertains generally to the field of cutting equipment, in particular narrow belt block saws. In certain aspects, the present disclosure provides improvements to existing designs, including guide bars for narrow belt block saws.

In some embodiments, a belt saw includes a guide bar system. The guide bar system comprises a guide bar including a first end section, a second end section, and a central section between the first end section and the second end section. A bottom channel is defined in the guide bar, and the bottom channel is adjacent to a bottom edge of the guide bar. A first upper fluid channel is defined in the guide bar. A fluid entrance to the first upper fluid channel is located in the first end section of the guide bar, and the first upper fluid channel extends to the central section of the guide bar.

A second upper fluid channel is defined in the guide bar. A fluid entrance to the second upper fluid channel is located in the second end section of the guide bar, and the second upper fluid channel extends to the central section of the guide bar. Both the first upper fluid channel and the second upper fluid channel are in fluid communication with the bottom channel of the guide bar.

A first upper fluid channel cap may be positioned over the first upper fluid channel and close the first upper fluid channel to either a first side of the guide bar if the first upper fluid channel is defined through the first side or a second side of the guide bar if the second upper fluid channel is defined through the second side. In some instances, the first upper fluid channel cap contacts a first upper recessed seat that extends along the first upper fluid channel. In some embodiments, an outward-facing surface of the first upper fluid channel cap does not protrude outward of either the first side or the second side of the guide bar. In some embodiments, the outward-facing surface of the first upper fluid channel cap is flush with the first side or the second side of the guide bar.

A second upper fluid channel cap may be positioned over the second upper fluid channel and close the second upper fluid channel to either the first side of the guide bar if the second upper fluid channel is defined through the first side or the second side of the guide bar if the second upper fluid channel is defined through the second side. In some instances, the second upper fluid channel cap contacts a second upper recessed seat that extends along the second upper fluid channel. In some embodiments, an outward-facing surface of the second upper fluid channel cap does not protrude outward of either the first side or the second side of the guide bar. In some embodiments, the outward-facing surface of the second upper fluid channel cap is flush with the first side or the second side of the guide bar.

At least a portion of the first upper fluid channel cap may be positioned laterally inward of the first side of the guide bar if the first upper fluid channel is defined through the first side, or at least a portion of the first upper fluid channel cap may be positioned laterally inward of the second side of the guide bar if the first upper fluid channel is defined through the second side. Likewise, at least a portion of the second upper fluid channel cap may be positioned laterally inward of the first side of the guide bar if the second upper fluid channel is defined through the first side, or at least a portion of the second upper fluid channel cap may be positioned laterally inward of the second side of the guide bar if the second upper fluid channel is defined through the second side.

In some embodiments, a first lower fluid channel is defined in the guide bar. A fluid entrance to the first lower fluid channel is located in the first end section of the guide bar, and the first lower fluid channel is in fluid communication with the bottom channel at the first end section of the guide bar. In some instances, a second lower fluid channel is also defined in the guide bar. A fluid entrance to the second lower fluid channel is located in the second end section of the guide bar, and the second lower fluid channel is in fluid communication with the bottom channel at the second end section of the guide bar.

In some aspects, a first lower fluid cover may be positioned over the first lower fluid channel to cover at least a portion of the first lower fluid channel. In some embodiments, the first lower fluid channel cap may contact a lower recessed seat at least partially surrounding the first lower fluid channel. Likewise, a second lower fluid cover may be positioned over the second lower fluid channel to cover at least a portion of the second lower fluid channel. In some embodiments, the second lower fluid channel cap may contact a lower recessed seat at least partially surrounding the second lower fluid channel.

Further forms, objects, features, aspects, benefits, advantages, and embodiments of the present invention will become apparent from a detailed description and drawings provided herewith.

DESCRIPTION OF THE SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 1:
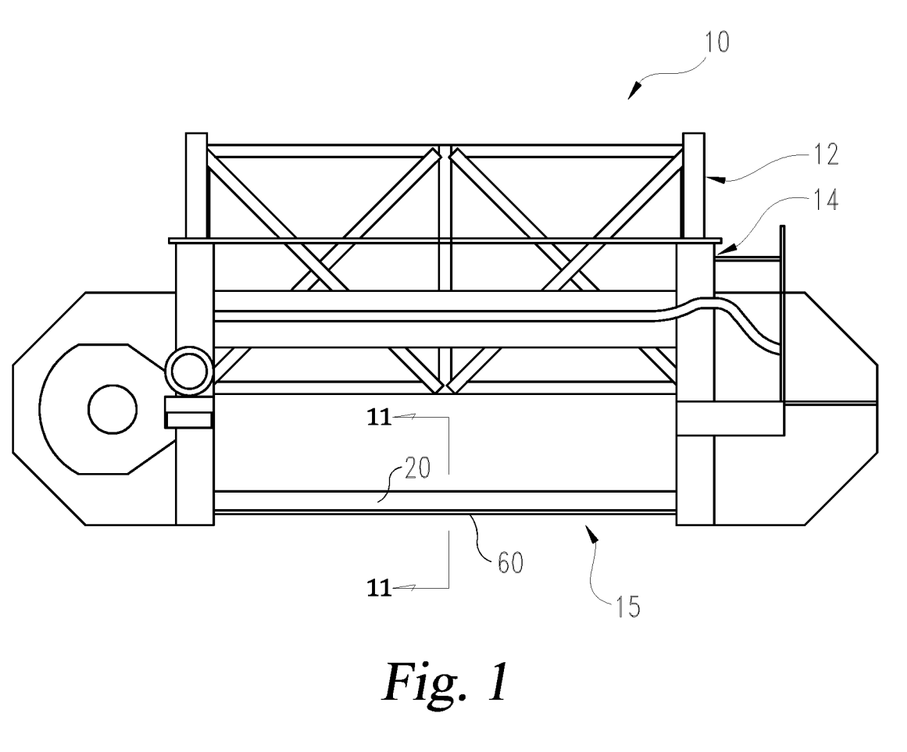
FIG. 1 is a front elevation view of a belt saw including a guide bar system.
Figure 11:
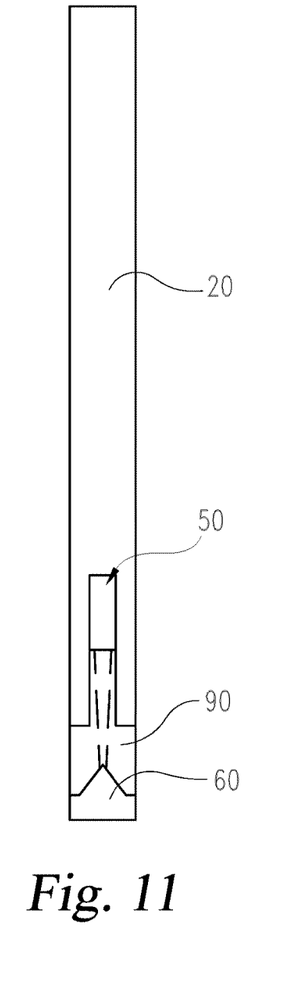
FIG. 11 is a cross-sectional view taken along lines 11-11 of the assembly of FIG. 1.

FIG. 1 illustrates a front elevation view of an exemplary belt saw 10. Belt saw 10 generally comprises a gantry saw frame 12 and a cutting frame 14. Cutting frame 14 supports a guide bar system 15, including a guide bar 20, and is movable relative to the gantry saw frame 12. During operation of belt saw 10, a stone block is positioned beneath the guide bar system 15 of cutting frame 14, and cutting frame 14 travels along a downward direction into the stone block as a flexible cutting belt 60 travels along a wear strip 90 (shown in FIG. 11) along the bottom of the guide bar system 15 to cut the stone block. After the cutting operation is complete, cutting frame 14 may be moved along a vertical direction so as to remove guide bar system 15 from the stone block and/or to prepare for a subsequent cut.

Figure 2:
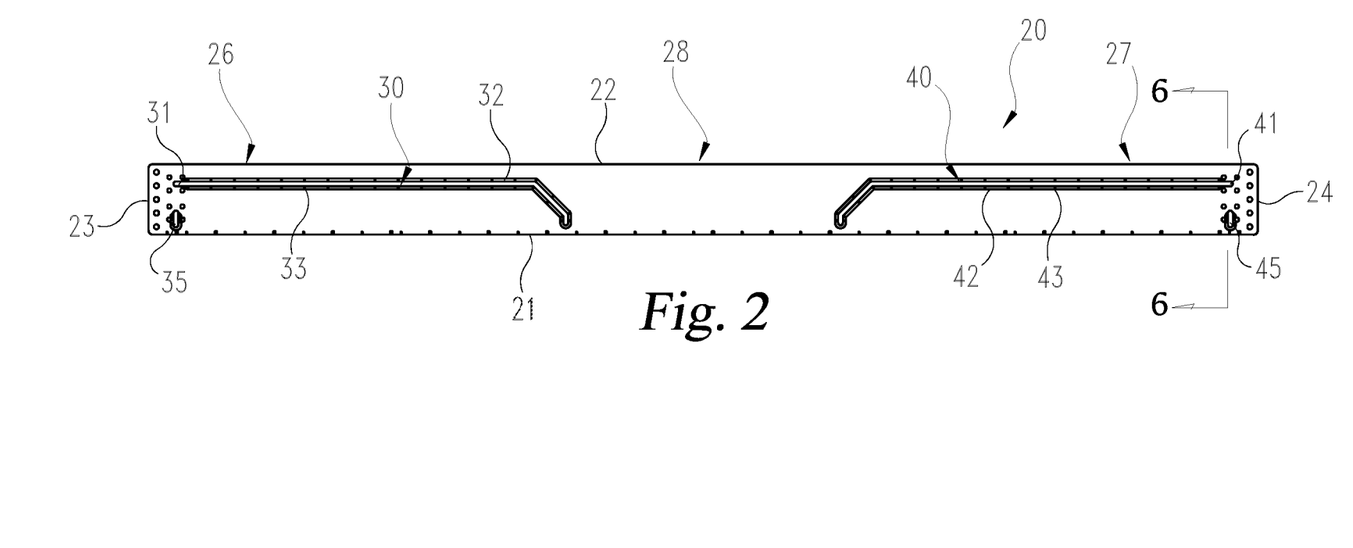
FIG. 2 is a front elevation view of a guide bar from the guide bar system of the belt saw of FIG. 1.

The guide bar 20 of the guide bar system 15 is shown in greater detail in FIG. 2. Guide bar 20 is preferably monolithic. The guide bar may be made of aluminum or steel (e.g., stainless steel). For example, the guide bar may be made of 7/16 inch thick aluminum. In other embodiments, the guide bar 20 may be 3/8 inch thick stainless steel. The guide bar 20, however, may be made of another suitable material and/or another thickness.

Guide bar 20 has a bottom edge 21 and a top edge 22 and a height that extends from the bottom edge 21 to the top edge 22. Guide bar 20 also includes a first end 23 and a second end 24 and has a length that extends from the first end 23 to the second end 24. A width of guide bar 20 is defined between a first side 25 and a second side 29 of guide bar 20 (see FIG. 6).

Guide bar 20 includes a first end section 26, shown on the left side of the guide bar 20 in FIG. 2, and a second end section 27, shown on the right side of the guide bar 20 in FIG. 2. Guide bar 20 also includes a central section 28 between the first end section 26 and the second end section 27.

A first upper fluid channel 30 is defined through a portion of the guide bar 20, extending from the first end section 26 of the guide bar 20 toward the central section 28 of the guide bar 20. A second upper fluid channel 40 is defined through a portion of the guide bar 20, extending from the second end section 27 of the guide bar 20 toward the central section 28 of the guide bar 20. In the embodiment shown, the first upper fluid channel 30 and the second upper fluid channel 40 are mirror images of each other.

In the embodiments shown, the first upper fluid channel 30 and the second upper fluid channel 40 are both defined through the same side of the guide bar 20. For example, the upper fluid channel 30 and the second upper fluid channel may each be defined through the first side 25 of the guide bar 20. In other examples, the upper fluid channel 30 and the second upper fluid channel may each be defined through the second side 29 of the guide bar 20. In still other embodiments, the first upper fluid channel 30 and the second upper fluid channel 40 may be defined through different sides of the guide bar 20. For example, the first upper fluid channel 30 may be defined through the first side 25 of the guide bar 20 and the second upper fluid channel 30 may be defined through the second side 29 of the guide bar 20.

Figure 3:
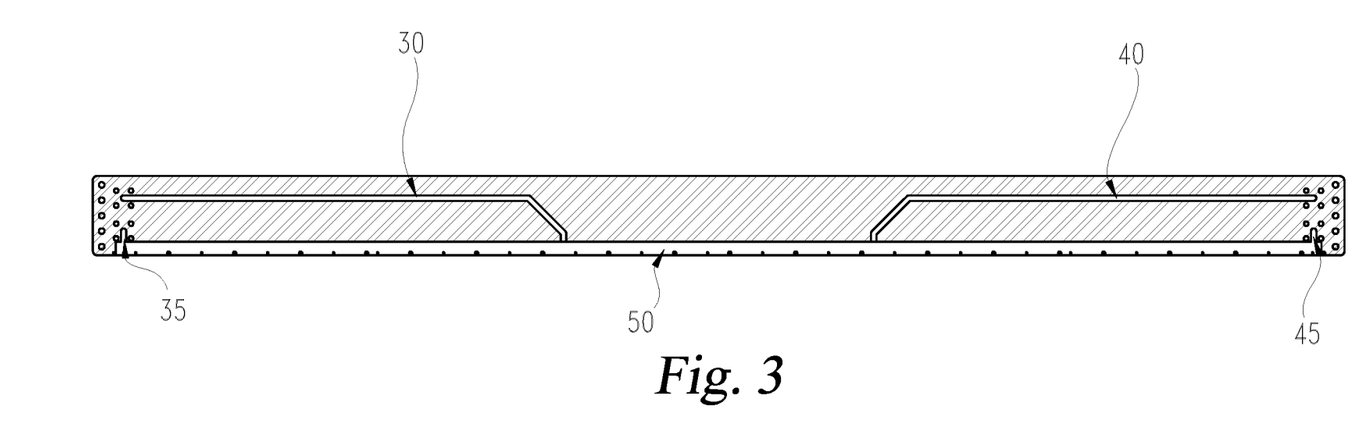
FIG. 3 is a front cross-sectional view of the guide bar of FIG. 2 taken along line 3-3 shown in FIG. 6.

As shown in FIG. 3, a bottom channel 50 is defined in the guide bar 20 and is adjacent to and extends through the bottom edge 21 of the guide bar 20. The bottom channel 50 is preferably configured to receive a wear strip 90 (shown in FIG. 11) that supports the flexible cutting belt 60. The first upper fluid channel 30 and the second upper fluid channel 40 are each in fluid communication with the bottom channel 50 in and/or near the central section 28 of the guide bar 20. In the embodiment shown, each of the upper fluid channels 30, 40 is capable of providing a lubricating and/or cooling fluid, such as water or any other suitable fluid, to at least a middle portion of a wear strip 90 (shown in FIG. 11) and cutting belt 60 supported on the guide bar 20.

A first lower fluid channel 35 has a depth defined along the width of the guide bar 20 and is in fluid communication with the bottom channel 50 near the first end section 26 of the guide bar 20. The first lower fluid channel 35 includes a first lower fluid channel entrance 38 through which fluid may be introduced into the first lower fluid channel 35. A corresponding second lower fluid channel 45 has a depth defined along the width of the guide bar 20 and is in fluid communication with the bottom channel 50 near the second end section 27 of the guide bar 20. The second lower fluid channel 45 includes a second lower fluid channel entrance 48 through which fluid may be introduced into the second lower fluid channel 45. The lower fluid channels are in fluid communication with the bottom channel 50 so that lubricating and/or cooling fluid may be provided to the ends of a wear strip 90 (shown in FIG. 11) and/or cutting belt 60 inserted supported on the bottom of the guide bar 20.

Figure 4:
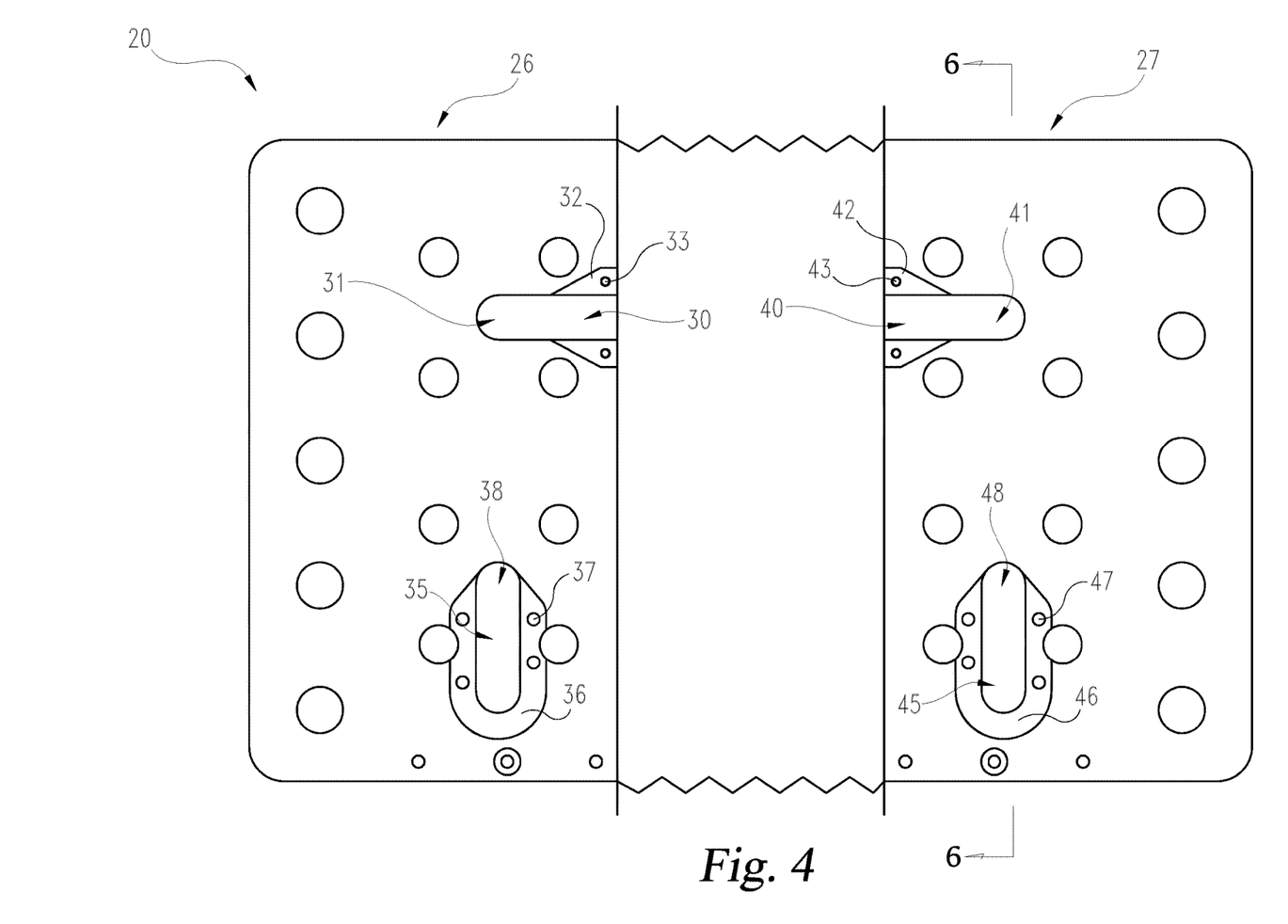
FIG. 4 is a partial front view of the end sections of the guide bar of FIG. 2.

A zoomed view of a portion of the first end section 26 and the second end section 27 of the guide bar 20 is shown in FIG. 4. As shown, the first upper fluid channel 30 has a first upper fluid channel entrance 31 at the end of the first upper fluid channel 30 that is positioned in the first end section 26 of the guide bar 20. An upper recessed seat 32 surrounds the first upping fluid channel 30 and is defined through a portion of the guide bar 20 to receive a first upper fluid channel cap 70 (see FIG. 6). The first upper fluid channel cap 70 fits within the upper recessed seat 32 and covers the first upper fluid channel 30 when the belt saw 10 is in operation.

As illustrated, the recessed seat 32 may not extend all of the way to the end of the first upper fluid channel 30, so that the first upper fluid channel entrance 31 is accessible even when the first upper fluid channel cap 70 is fit within the upper recessed seat 32. Upper cap attachment points 33 are provided within recessed seat 32 for attaching the first upper fluid channel cap 70 within the recessed seat 32.

Figure 8:
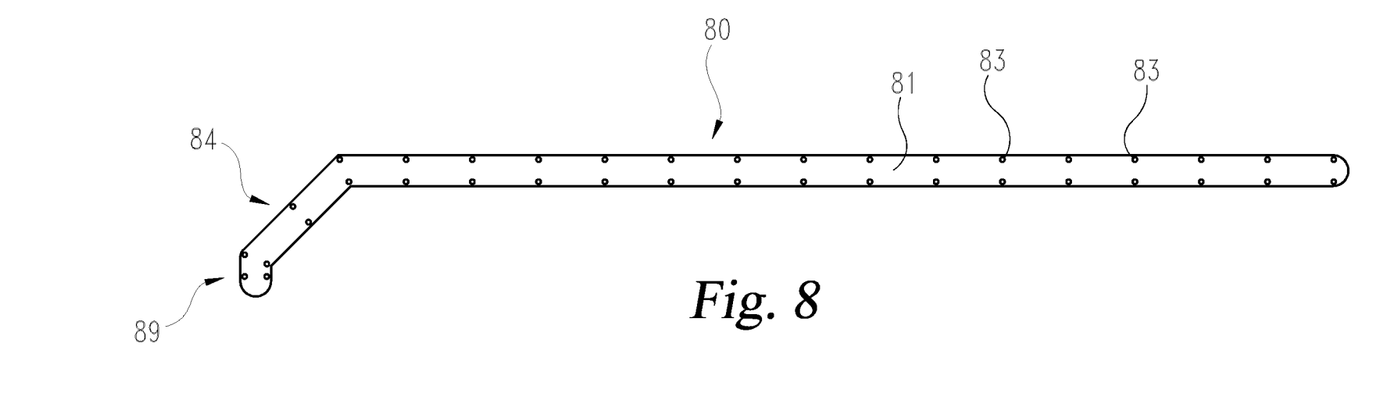
FIG. 8 is a front elevation view of a second upper fluid channel cap of the guide bar system of the belt saw of FIG. 1.

The first lower fluid channel 35 in the first end section 26 also includes a lower recessed seat 36 that is defined through a depth of the guide bar 20 and configured to receive a first lower fluid channel cap 75 (see FIG. 8). Lower cap attachment points 37 are provided in the lower recessed seat 36 for attaching the first lower fluid channel cap 75 to the guide bar 20 within the lower recessed seat 36. The first lower fluid channel cap 75 provides access to (e.g., does not cover) the first lower fluid channel entrance 38 when positioned within the lower recessed seat 36. Preferably, the lower recessed seat 36 tapers toward the first lower fluid channel entrance 38.

The second end section 27 can have the same structure as the first end section 26—shown as mirrored in the illustrated embodiment. The second end section 27 includes a second upper fluid channel entrance 41 at the end of the second upper fluid channel 40 that is positioned in the second end section 27 of the guide bar 20. An upper recessed seat 42 surrounds the second upping fluid channel 40 and is defined through a portion of the guide bar 20 to receive a first upper fluid channel cap 80 (see FIG. 7). Upper cap attachment points 43 are provided within recessed seat 42 for attaching the second upper fluid channel cap 80 within the recessed seat 42. A second upper fluid channel entrance 41 is accessible even when the second upper fluid channel cap 80 is fit within the upper recessed seat 42. Preferably, the recessed seat 42 does not extend all of the way to the end of the second upper fluid channel 40.

Figure 9:
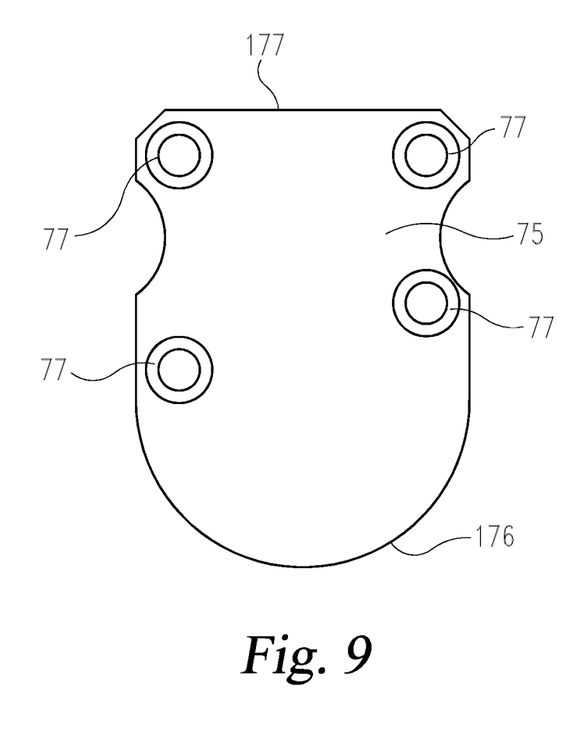
FIG. 9 is a front elevation view of a first lower fluid cap of the guide bar system of the belt saw of FIG. 1.

The second lower fluid channel 45 in the second end section 27 also includes a lower recessed seat 46 that is defined through a depth of the guide bar 20 and configured to receive a second lower fluid channel cap 85 (see FIG. 9). Lower cap attachment points 47 are provided in the lower recessed seat 46 for attaching the second lower fluid channel cap 85 to the guide bar 20 within the lower recessed seat 46. The second lower fluid channel cap 85 provides access to (e.g., does not) cover the second lower fluid channel entrance 48. Preferably, the lower recessed seat 46 tapers toward the second lower fluid channel entrance 48.

Figure 5:
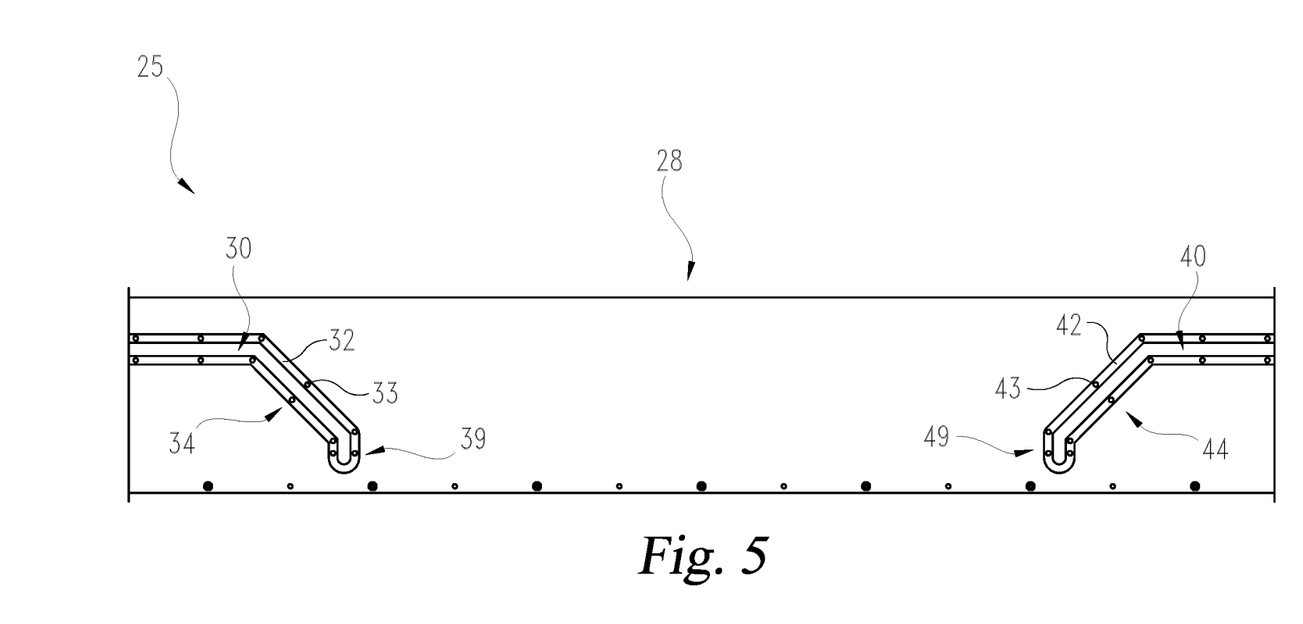
FIG. 5 is a partial front view of the central section of the guide bar of FIG. 2.

A zoomed view of the central section 28 is illustrated in FIG. 5. As shown, the upper fluid channels 30, 40 each have an angled portion 34, 44 where the upper fluid channel 30, 40 extends toward the bottom channel 50. In the embodiment, shown in FIG. 5, the angled portions 34, 44 extend at an angle of about 45 degrees with respect to the portion of the upper fluid channels 30, 40 in the first end section 26 and second end section 27, respectively. However, in other embodiments, the angle of the angled portions 34, 44 may be modified as desired. A lower channel connection portion 39, 49 extends from each of the angled portions 34, 44 to connect the upper fluid channels 30, 40 to the bottom channel 50. In the embodiment shown, the lower channel connection portion 39, 49 is approximately perpendicular with respect to the portion of the upper fluid channels 30, 40 in the first end section 26 and second end section 27, respectively. However, in other embodiments, the lower channel connection portion 39, 49 may be arranged at any angle as desired. In still other embodiments, the angled portions 34, 44 may extend directly to the bottom channel 50 so that there is no distinct lower channel connection portion 39, 49.

Figure 6:
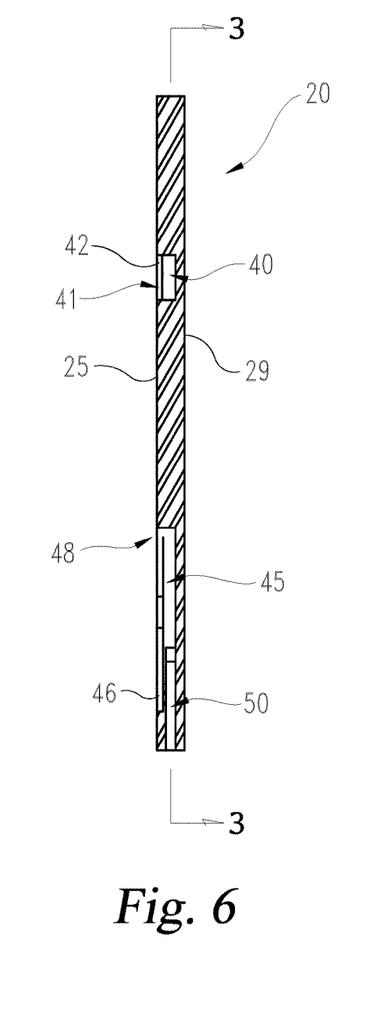
FIG. 6 is a cross-sectional side view of the guide bar of FIG. 2.

A cross-sectional side view of the guide bar 20 is shown in FIG. 6. As illustrated, in this embodiment, the second upper fluid channel 40 and the bottom channel 50 do not extend through the entire width of the guide bar 20. Additionally, in the embodiment shown, the second lower fluid channel 45 leading to the bottom channel 50 extends through an approximately equal depth as the bottom channel 50. Although not shown in this view, the first upper fluid channel 30 and the first lower fluid channel 35 are arranged in a similar manner so that the first upper fluid channel 30 and the first lower fluid channel 35 do not extend through the entire width of the guide bar 20.

Figure 7:
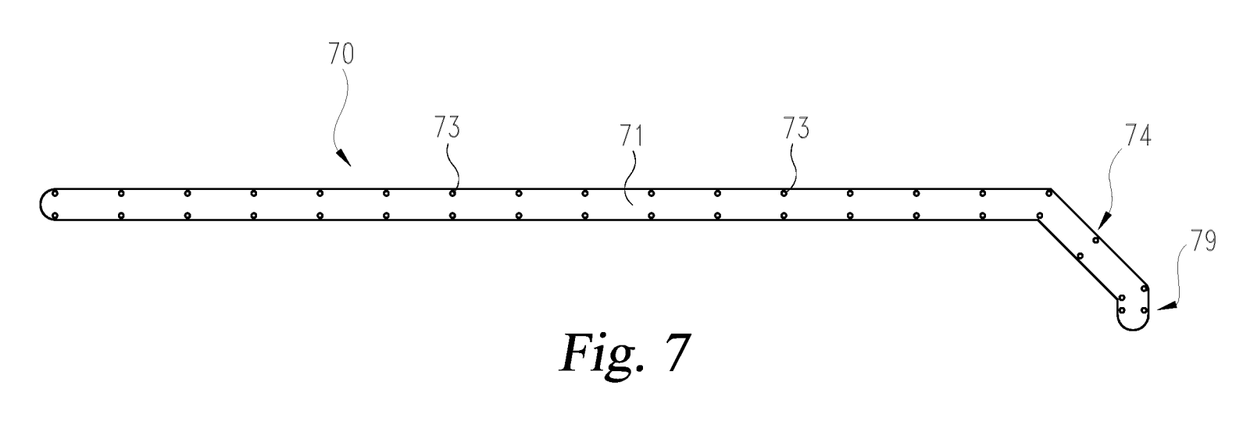
FIG. 7 is a front elevation view of a first upper fluid channel cap of the guide bar system of the belt saw of FIG. 1.

FIG. 7 shows a front view of the first upper fluid channel cap 70. The fluid channel cap 70 includes a cap body 71 that is shaped to fit over the upper fluid channel 30 and to rest on the recessed seat 32 when the fluid channel cap 70 is fit to cover the upper fluid channel 30. The cap body 71 includes an angled portion 74 that corresponds to the angled portion 34 of the first upper fluid channel 30 and includes a lower channel connection portion 79 that corresponds to the lower channel connection portion 39 of the first upper fluid channel 30.

Cap attachment points 73 are distributed on cap body 71 to correspond with the position of the upper cap attachment points 33 on the recessed seat 32 in the first upper fluid channel 30. When the first upper fluid channel cap 70 is placed on recessed seat 32 to cover the upper fluid channel 30, attachment mechanisms such as screws, bolts, rivets, welds or other suitable attachments may be used to secure the first upper fluid channel cap 70 on the recessed seat 32.

FIG. 8 shows a front view of the second upper fluid channel cap 80 which is the same as the first second upper fluid channel cap 70, but mirrored to fit the second upper fluid channel 40. The fluid channel cap 80 includes a cap body 81 that is shaped to fit over the second upper fluid channel 40 and to rest on the recessed seat 42 when the fluid channel cap 80 is fit to cover the second upper fluid channel 40. The cap body 81 includes an angled portion 84 that corresponds to the angled portion 44 of the second upper fluid channel 40 and includes a lower channel connection portion 89 that corresponds to the lower channel connection portion 49 of the second upper fluid channel 40.

Cap attachment points 83 are distributed on cap body 81 to correspond with the position of the upper cap attachment points 43 on the recessed seat 42 in the second upper fluid channel 40. When the second upper fluid channel cap 80 is placed on recessed seat 42 to cover the upper fluid channel 80, attachment mechanisms such as screws, bolts, rivets, welds or other suitable attachments may be used to secure the second upper fluid channel cap 80 on the recessed seat 42.

A first lower channel cap 75 is illustrated in FIG. 9. The first lower channel cap 75 is sized to cover the first lower fluid channel 35 for the bottom channel 50 in the first end section 26. A bottom edge 176 of the first lower channel cap 75 is rounded to correspond to the shape of the first lower fluid channel 35; however, an upper edge 177 of the first lower channel cap 75 does not corresponded to the rounded shape of the first lower fluid channel 35 and, instead, may be straight as shown in the illustrated embodiment. This allows a portion of the first lower fluid channel 35 to be left open even when the first lower channel cap 75 is attached to the guide bar 20.

Cover attachment openings 77 are defined through the first lower channel cap 75 and are positioned on the first lower channel cap 75 to correspond with the position of the lower cap attachment points 37 on the lower recessed seat 36. The cover attachment openings 77 may be countersunk and/or counterbored for receiving the attachment member, such as a screw or bolt, that is used to attach the lower channel cap 75 to the guide bar 20. This allows the attachment member to be recessed so that it is flush with and/or below an outer surface of the lower channel cap 75.

In the embodiments shown, the cover attachment openings 77 on one side (e.g., the left side) of the first lower channel cap 75 are spaced further apart than the cover attachment openings 77 on another side (e.g., the right side) of the first lower channel cap 75. In other embodiments, the spacing between the cover attachment openings 77 may be the same, or may be switched (e.g., so that the cover attachment openings 77 on the right side are space further apart than the openings on the left side). Additionally, in other embodiments, more or fewer cover attachment openings 77 may be included on the lower channel cap 75.

Figure 10:
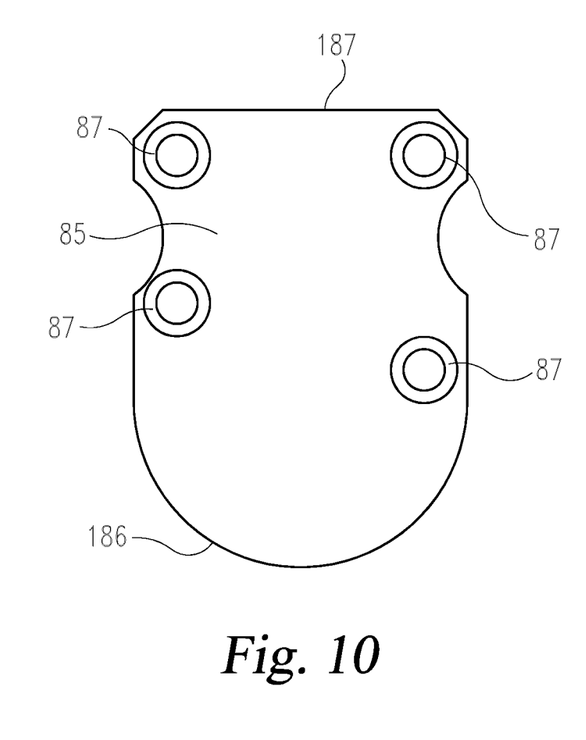
FIG. 10 is a front elevation view of a second lower fluid cap of the guide bar system of the belt saw of FIG. 1.

A second lower channel cap 85 is illustrated in FIG. 10. The second lower channel cap 85 can have the same structure as the first lower channel cap 75 but may be mirrored. The second lower channel cap 85 is sized to cover the second lower fluid channel 45 for direct access to the bottom channel 50 in the second end section 27. A bottom edge 186 of the second lower channel cap 85 is rounded to correspond to the shape of the second lower fluid channel 45. An upper edge 187 of the second lower channel cap 85 preferably does not corresponded to the rounded shape of the second lower fluid channel 45 (e.g., may be straight). This allows a portion of the second lower fluid channel 45 to be left open even when the second lower channel cap 85 is attached to the guide bar 20.

Cover attachment openings 87 are defined through the second lower channel cap 85 and are positioned on the second lower channel cap 85 to correspond with the position of the lower cap attachment points 47 on the lower recessed seat 46. The cover attachment openings 87 may be countersunk and/or counterbored for receiving the attachment member, such as a screw or bolt, that is used to attach the lower channel cap 85 to the guide bar 20. This allows the attachment member to be flush with and/or below an outer surface of the lower channel cap 85.

In the embodiments shown, the cover attachment openings 87 on one side (e.g., the right side) of the second lower channel cap 85 are spaced further apart than the cover attachment openings 87 on another side (e.g., the left side) of the second lower channel cap 85. In other embodiments, the spacing between the cover attachment openings 87 may be the same, or may be switched (e.g., so that the cover attachment openings 87 on the left side are space further apart than the openings on the right side). Additionally, in other embodiments, more or fewer cover attachment openings 87 may be included on the lower channel cap 85.

Preferably, when caps 70, 80, 75, and/or 85 are positioned on their respective seats 32, 42, 36, 46 of the guide bar, an outward-facing surface of the cover(s) does not protrude outward of an outward-facing surface of the guide bar adjacent to the cover(s). More preferably, the outward-facing surface of the cover is flush with the outward-facing surface of the guide bar. In these embodiments, the caps 70, 80, 75, and/or 85 have at least a portion of the cap 70, 80, 75, and/or 85 that is positioned laterally inward of the first side 25 or the second side 29 of the guide bar 20 when positioned on their respective seats 32, 42, 36, 46.

The following numbered clauses set out specific embodiments that may be useful in understanding the present invention:

1. A guide bar system comprising:
    a guide bar having a height extending from a bottom edge to a top edge of the guide bar, a width extending from a first side to a second side of the guide bar, and a length extending from a first end section to a second end section of the guide bar and having a central section between said first end section and said second end section;
    a bottom channel defined in said guide bar, wherein said bottom channel is adjacent to the bottom edge of said guide bar and extends along a length of the guide bar;
    a first upper fluid channel defined in the first side of said guide bar, wherein a fluid entrance to said first upper fluid channel is located in said first end section of said guide bar, and wherein said first upper fluid channel extends to said central section of said guide bar;
    a second upper fluid channel defined in the first or second side of said guide bar, wherein a fluid entrance to said second upper fluid channel is located in said second end section of said guide bar, and wherein said second upper fluid channel extends to said central section of said guide bar;
    a first upper fluid channel cap positioned over the first upper fluid channel and closing said first upper fluid channel to the first side of the guide bar along a length thereof;
    wherein the first upper fluid channel cap has at least a portion positioned laterally inward of the first side of the guide bar; and
    wherein said first upper fluid channel and said second upper fluid channel are in fluid communication with said bottom channel.
2. The guide bar system of clause 1, wherein the fluid entrance to said first upper fluid channel is defined by said first side of the guide bar.
3. The guide bar system of any preceding clause, wherein the fluid entrance to said second upper fluid channel is defined by the same side of the guide bar as said second upper fluid channel.
4. The guide bar system of any preceding clause, wherein an outward-facing surface of the first upper fluid channel cap does not protrude outward of said first side.
5. The guide bar system of clause 4, wherein the outward-facing surface of the first upper fluid channel cap is flush with said first side.
6. The guide bar system of any preceding clause, wherein the first upper fluid channel cap contacts an upper recessed seat extending along said first upper fluid channel.

7. The guide bar system of any preceding clause, comprising:
a second upper fluid channel cap positioned over the second upper fluid channel and closing said second upper fluid channel along a length thereof.

8. The guide bar system of clause 7, wherein the second upper fluid channel cap has at least a portion positioned laterally inward of the side of the guide bar defining said second upper fluid channel.

9. The guide bar system of clause 8, wherein the second upper fluid channel cap contacts an upper recessed seat extending along said second upper fluid channel.

10. The guide bar system of clause 8 or 9, wherein an outward-facing surface of the second upper fluid channel cap does not protrude outward of the side of the guide bar defining said second upper fluid channel.

11. The guide bar system of clause 10, wherein the outward-facing surface of the first upper fluid channel cap is flush with the side of the guide bar defining said second upper fluid channel.

12. The guide bar system of any one of the preceding claims, wherein the second upper fluid channel is defined in the first side of said guide bar.

13. The guide bar system of any one of the preceding clauses, comprising:
a first lower fluid channel defined in said guide bar, wherein a fluid entrance to said first lower fluid channel is located above said bottom channel in said first end section of said guide bar; and
wherein said first lower fluid channel is in fluid communication with said bottom channel at said first end section of said guide bar.

14. The guide bar system of clause 13, wherein said fluid entrance to said first lower fluid channel is defined by said first side of said guide bar.

15. The guide bar system of any preceding clause, further comprising:
a second lower fluid channel defined in said guide bar, wherein a fluid entrance to said second lower fluid channel is located above said bottom channel in said second end section of said guide bar; and
wherein said second lower fluid channel is in fluid communication with said bottom channel at said second end section of said guide bar.

16. The guide bar system of clause 15, wherein said fluid entrance to said second lower fluid channel is defined by said first side of said guide bar.

17. A guide bar system comprising:
a guide bar having a height extending from a bottom edge to a top edge of the guide bar, a width extending from a first side to a second side of the guide bar, and a length extending from a first end section to a second end section of the guide bar and having a central section between said first end section and said second end section;
a bottom channel defined in said guide bar, wherein said bottom channel is adjacent to the bottom edge of said guide bar and extends along at least a portion of the length of the guide bar;
a first upper fluid channel defined in the first side of said guide bar, wherein a fluid entrance to said first upper fluid channel is located in said first end section of said guide bar, and wherein said first upper fluid channel extends to said central section of said guide bar;
a second upper fluid channel defined in the first or second side of said guide bar, wherein a fluid entrance to said second upper fluid channel is located in said second end section of said guide bar, and wherein said second upper fluid channel extends to said central section of said guide bar;
a first lower fluid channel defined in said guide bar, positioned in said first end section of said guide bar and wherein said first lower fluid channel is in fluid communication with said bottom channel; and
a second lower fluid channel defined in said guide bar, positioned in said second end section of said guide bar, and wherein said second lower fluid channel is in fluid communication with said bottom channel.

18. The guide bar system of clause 17, further comprising:
a first lower fluid cover positioned over the first lower fluid channel to cover at least a portion of the first lower fluid channel.

19. The guide bar system of clause 18, wherein the first lower fluid channel cap contacts a lower recessed seat at least partially surrounding the first lower fluid channel.

20. The guide bar system of any one of clauses 17-19, further comprising:
a second lower fluid cover positioned over the second lower fluid channel to cover at least a portion of the second lower fluid channel.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A guide bar system comprising:
a guide bar having a height extending from a bottom edge to a top edge of the guide bar, a width extending from a first side to a second side of the guide bar, and a length extending from a first end section to a second end section of the guide bar and having a central section between said first end section and said second end section;
a bottom channel defined in said guide bar, wherein said bottom channel is adjacent to the bottom edge of said guide bar and extends along at least a portion of the length of the guide bar;
a first upper fluid channel defined in the first side of said guide bar, wherein a fluid entrance to said first upper fluid channel is located in said first end section of said guide bar, and wherein said first upper fluid channel extends to said central section of said guide bar;
a second upper fluid channel defined in the first or second side of said guide bar, wherein a fluid entrance to said second upper fluid channel is located in said second end section of said guide bar, and wherein said second upper fluid channel extends to said central section of said guide bar;
a first upper fluid channel cap positioned over the first upper fluid channel and closing said first upper fluid channel to the first side of the guide bar along a length thereof;
wherein the first upper fluid channel cap has at least a portion positioned laterally inward of the first side of the guide bar; and wherein said first upper fluid channel and said second upper fluid channel are in fluid communication with said bottom channel.

2. The guide bar system of claim 1, wherein the fluid entrance to said first upper fluid channel is defined through said first side of the guide bar.

3. The guide bar system of claim 1, wherein the fluid entrance to said second upper fluid channel is defined through the same side of the guide bar as said second upper fluid channel.

4. The guide bar system of claim 1, wherein an outward-facing surface of the first upper fluid channel cap does not protrude outward of said first side.

5. The guide bar system of claim 4, wherein the outward-facing surface of the first upper fluid channel cap is flush with said first side.

6. The guide bar system of claim 1, wherein the first upper fluid channel cap contacts an upper recessed seat extending along said first upper fluid channel.

7. The guide bar system of claim 1, comprising:
a second upper fluid channel cap positioned over the second upper fluid channel and closing said second upper fluid channel along a length thereof.

8. The guide bar system of claim 7, wherein the second upper fluid channel cap has at least a portion positioned laterally inward of the side of the guide bar defining said second upper fluid channel.

9. The guide bar system of claim 8, wherein the second upper fluid channel cap contacts an upper recessed seat extending along said second upper fluid channel.

10. The guide bar system of claim 8, wherein an outward-facing surface of the second upper fluid channel cap does not protrude outward of the side of the guide bar defining said second upper fluid channel.

11. The guide bar system of claim 10, wherein the outward-facing surface of the first upper fluid channel cap is flush with the side of the guide bar defining said second upper fluid channel.

12. The guide bar system of claim 1, wherein the second upper fluid channel is defined in the first side of said guide bar.

13. The guide bar system of claim 1, comprising:
a first lower fluid channel defined in said guide bar, wherein a fluid entrance to said first lower fluid channel is located above said bottom channel in said first end section of said guide bar; and wherein said first lower fluid channel is in fluid communication with said bottom channel at said first end section of said guide bar.

14. The guide bar system of claim 13, wherein said fluid entrance to said first lower fluid channel is defined by said first side of said guide bar.

15. The guide bar system of claim 1, further comprising:
a second lower fluid channel defined in said guide bar, wherein a fluid entrance to said second lower fluid channel is located above said bottom channel in said second end section of said guide bar; and
wherein said second lower fluid channel is in fluid communication with said bottom channel at said second end section of said guide bar.

16. The guide bar system of claim 15, wherein said fluid entrance to said second lower fluid channel is defined by said first side of said guide bar.

17. A guide bar system comprising:
a guide bar having a height extending from a bottom edge to a top edge of the guide bar, a width extending from a first side to a second side of the guide bar, and a length extending from a first end section to a second end section of the guide bar and having a central section between said first end section and said second end section;
a bottom channel defined in said guide bar, wherein said bottom channel is adjacent to the bottom edge of said guide bar and extends along at least a portion of the length of the guide bar;
a first upper fluid channel defined in the first side of said guide bar, wherein a fluid entrance to said first upper fluid channel is located in said first end section of said guide bar, and wherein said first upper fluid channel extends to said central section of said guide bar;
a second upper fluid channel defined in the first or second side of said guide bar, wherein a fluid entrance to said second upper fluid channel is located in said second end section of said guide bar, and wherein said second upper fluid channel extends to said central section of said guide bar;
a first lower fluid channel defined in said guide bar, positioned in said first end section of said guide bar and wherein said first lower fluid channel is in fluid communication with said bottom channel; and
a second lower fluid channel defined in said guide bar, positioned in said second end section of said guide bar, and wherein said second lower fluid channel is in fluid communication with said bottom channel.

18. The guide bar system of claim 17, further comprising:
a first lower fluid cover positioned over the first lower fluid channel to cover at least a portion of the first lower fluid channel.

19. The guide bar system of claim 18, wherein the first lower fluid channel cap contacts a lower recessed seat at least partially surrounding the first lower fluid channel.

20. The guide bar system of claim 17, further comprising:
a second lower fluid cover positioned over the second lower fluid channel to cover at least a portion of the second lower fluid channel.

* * * * *